United States Patent [19]
Evans et al.

[11] Patent Number: 5,663,605
[45] Date of Patent: Sep. 2, 1997

[54] ROTATING ELECTRICAL MACHINE WITH ELECTROMAGNETIC AND PERMANENT MAGNET EXCITATION

[75] Inventors: Paul Michael Evans, Ypsilanti; Roy David Schultz, Dearborn, both of Mich.

[73] Assignee: Ford Motor Company, Dearborn, Mich.

[21] Appl. No.: 433,187

[22] Filed: May 3, 1995

[51] Int. Cl.$^6$ .................... H02K 21/00; H02K 21/04
[52] U.S. Cl. .................... 310/181; 310/156; 310/179; 310/180; 310/261; 310/269; 310/263; 310/187
[58] Field of Search ..................... 310/180, 181, 310/263, 269, 187, 261, 179, 156

[56] References Cited

U.S. PATENT DOCUMENTS

| | | | |
|---|---|---|---|
| 3,411,027 | 11/1968 | Rosenberg | 310/263 |
| 3,413,502 | 11/1968 | Schwab | 311/181 |
| 3,555,327 | 1/1971 | Terry | 310/168 |
| 4,882,515 | 11/1989 | Radomski | 310/263 |
| 4,959,577 | 9/1990 | Radomski | 310/263 |
| 4,978,878 | 12/1990 | Dijken | 310/268 |
| 4,980,595 | 12/1990 | Arora | 310/263 |
| 5,047,680 | 9/1991 | Torok | 310/156 |
| 5,057,731 | 10/1991 | Hancock | 310/180 |
| 5,130,595 | 7/1992 | Arora | 310/268 |
| 5,132,581 | 7/1992 | Kusase | 310/263 |
| 5,177,391 | 1/1993 | Kusase | 310/263 |
| 5,304,882 | 4/1994 | Lipo et al. | 310/156 |
| 5,371,426 | 12/1994 | Nagate et al. | 310/156 |
| 5,397,795 | 3/1995 | Syverson | 322/46 |
| 5,502,368 | 3/1996 | Syverson et al. | 322/28 |

FOREIGN PATENT DOCUMENTS

| | | |
|---|---|---|
| 1238273 | of 1960 | France . |
| 1453957 | 12/1966 | France . |
| 61-116954 | 10/1986 | Japan . |
| 5304752 | 11/1993 | Japan . |

OTHER PUBLICATIONS

Research Report 94–15, entitled "A Rotor Lamination Design For Surface Permanent Magnet Retention At High Speeds"; by M. W. Degner et al; Jun. 1994.
ICEM 94 vol. 1, entitled "Synchronous Machines With Permanent Magnet And Reluctance Rotor Sections"; by B. J. Chalmers et al; 5–8 Sep. 1994.
ICEM 94 vol. 2, entitled "Improvement Of The Output Performance Of Claw–Pole Alternators By Additional Permanent–Magnets"; by C Henneberger et al; 5–8 Sep. 1994.

Primary Examiner—Steven L. Stephan
Assistant Examiner—Elvin G. Enad
Attorney, Agent, or Firm—Mark S. Sparschu

[57] ABSTRACT

In several embodiments of the present invention, an alternator is disclosed. The alternator includes a rotor having both wound-field and permanent magnet poles. The wound-field and permanent magnet poles are disposed about the circumference of the rotor.

10 Claims, 2 Drawing Sheets

ROTATING ELECTRICAL MACHINE WITH ELECTROMAGNETIC AND PERMANENT MAGNET EXCITATION

BACKGROUND OF THE INVENTION

1. Field of the Invention

The present invention relates to rotating electrical machines.

2. Description of the Related Art

One of the challenges in the design of electrical systems for automobiles relates to the generation of electrical power. With the increasing number of electrical features on automobiles comes the need for increased electric power generation. Thus, one challenge is to find an alternator which can provide this increased power with a minimum of adverse vehicle-level consequences (such as increased cost, increased mass, increased packaging volume, and the like).

Further, because the power consumption of most electrical loads on an automobile is independent of engine speed, the aforementioned increased need for electrical power exists down to engine idle. Because the power output of alternators is generally a function of the speed at which they are driven, a large electrical load at idle can be particularly difficult to supply.

One proposed solution to the above concerns is a so-called "hybrid" alternator. Such an alternator would contain a rotor which combines field windings (a conventional feature of almost all present alternators) with added permanent magnets. Several patents disclose hybrid alternators, including U.S. Pat. No. 3,555,327, issued to Terry; U.S. Pat. No. 4,980,595, issued to Arora; U.S. Pat. Nos. 4,882,515 and 4,959,577, issued to Radomski; U.S. Pat. Nos. 5,132,581 and 5,177,391, issued to Kusase; and U.S. Pat. No. 5,397,975, issued to Syverson.

Although those designs just mentioned may have desirable features, other designs may provide superior power output. Just as importantly, alternative designs may prove to be more manufacturable than those designs. Thus, an alternator which can provide improved power output, particularly at low speeds, and which can do so in a highly manufacturable design, will provide advantages over the prior art.

SUMMARY OF THE INVENTION

The present invention provides an electrical machine. The electrical machine includes a generally-annular stator and a rotor rotateably mounted within the stator. The rotor comprises a plurality of wound-field poles disposed about at least one portion of the circumference of the rotor and a plurality of permanent magnet poles all disposed about at least one circumferentially-shifted portion of the circumference of the rotor. The permanent magnet poles each further have a magnetized surface of one polarity generally facing the stator and a magnetized surface of the opposite polarity generally facing away from the stator.

The present invention further provides another electrical machine. The electrical machine comprises a generally-annular stator and a rotor rotateably mounted within the stator. The rotor includes a plurality of wound-field poles disposed about at least one portion of the circumference of the rotor and a plurality of permanent magnet poles all disposed about at least one circumferentially-shifted portion of the circumference of the rotor. The wound-field poles are disposed in circumferentially-consecutive pairs.

The present invention additionally provides an electrical machine comprising a generally-annular stator and a rotor rotateably mounted within the stator, the rotor comprising a plurality of wound salient poles. The wound salient poles each further comprise a base and a winding about the base. At least some of the bases of the salient poles are substantially parallel to one another.

One embodiment of this invention is an alternator which has the potential to provide improved power output, particularly at low speeds, over other alternative alternator designs. This alternator is also highly manufacturable, an advantage over many other designs. For these reasons, the present invention can provide advantages over the prior art.

BRIEF DESCRIPTION OF THE DRAWINGS

FIG. 2 also shows a partial cross-section of stator 74 of an alternator 75 which comprises rotor 10 and stator 74.

DETAILED DESCRIPTION OF THE PREFERRED EMBODIMENTS

Figure 1:
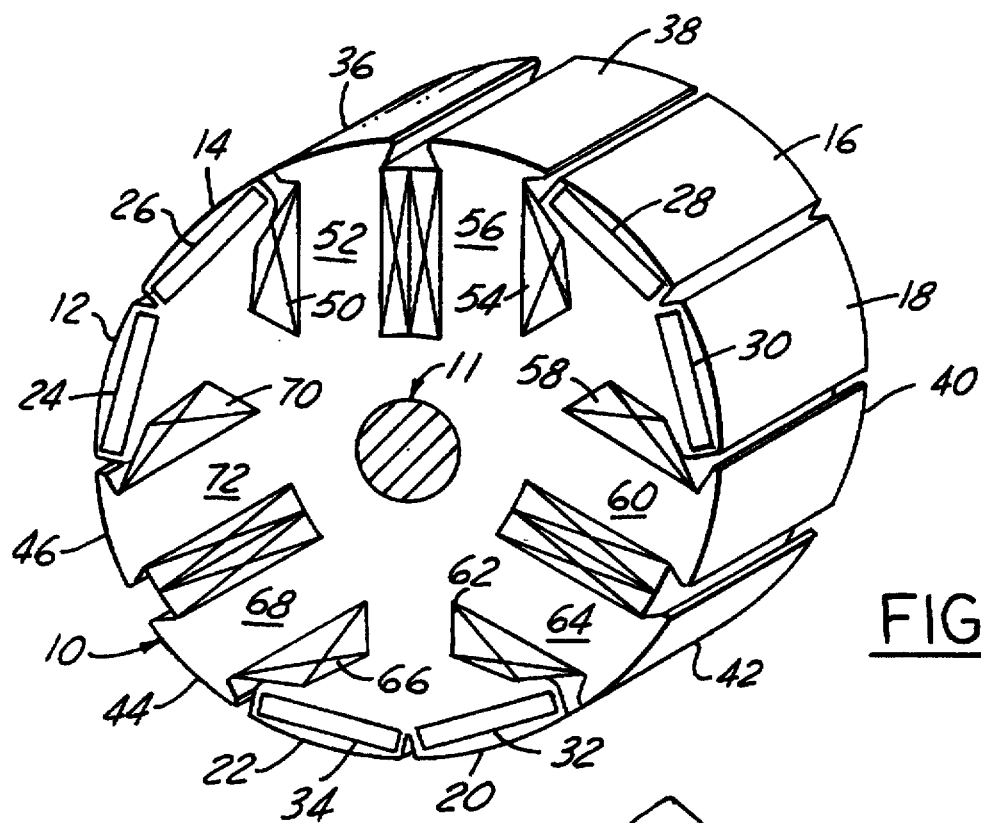
FIG. 1 is a cross-sectional view of a rotor 10 of an electrical machine according to one embodiment of the present invention.

Referring now to FIG. 1, a rotor 10 for an electrical machine according to one embodiment of the present invention will be described. Rotor 10 is rotateably mounted on a shaft 11. In this embodiment of the present invention, rotor 10 has 12 magnetic poles, though the invention is not so limited. Six of the poles 12, 14, 16, 18, 20 and 22 are formed by permanent magnets 24, 26, 28, 30, 32 and 34. The remaining six poles 36, 38, 40, 42, 44 and 46 are wound poles. Those skilled in the art will recognize those wound poles as "salient" poles, as opposed to "claw poles" in Lundell-type rotors.

Poles 36, 38, 40, 42, 44 and 46 are magnetized by field windings. Those windings include winding 50, wound around base 52 of pole 36; winding 54, wound around base 56 of pole 38; winding 58, wound around base 60 of pole 40; winding 62, wound around base 64 of pole 42; winding 66, wound around base 68 of pole 44; and winding 70, wound around base 72 of pole 46. In the preferred embodiment of the present invention, windings 50, 54, 58, 62, 66 and 70 are all connected in series. However, this series connection is not an essential feature of the present invention.

Windings 50, 54, 58, 62, 66 and 70 are wound such that for each adjacent (that is, consecutive) pair of wound poles (e.g., 36 and 38; 40 and 42; or 44 and 46), the windings on the two adjacent poles are wound in opposite directions. Thus, for a given direction of current flowing in the field coil comprising windings 50, 54, 58, 62, 66 and 70, the adjacent poles in each pair of poles will have opposite magnetic polarities.

With respect to permanent magnet poles 12, 14, 16, 18, 20 and 22, these poles are likewise adapted such that for each adjacent (that is, consecutive) pair of poles (e.g., 12 and 14; 16 and 18; or 20 and 22) the two poles have opposite magnetic polarities. The magnetic polarity of each permanent magnet pole is the magnetic polarity of the radiallyoutward surface of the permanent magnet within the pole (e.g., permanent magnet 24 within pole 12).

In the preferred embodiment of the present invention, permanent magnets 24, 26, 28, 30, 32 and 34 are rectangular in cross-section. They are preferably neodymium-iron-boron (NdFeB) or other rare earth material, though ceramic or other permanent magnet material can also be used to advantage in this invention.

Rotor 10 is preferably constructed of iron laminations, each punched with the cross-sectional features shown in FIG. 1. When the laminations are stacked together, the rectangular pockets for permanent magnets 24, 26, 28, 30, 32 and 34 are formed. Once the permanent magnets are inserted into their respective pockets, a final non-magnetic lamination without openings for permanent magnets 24, 26, 28, 30, 32 and 34 can be added on each end of rotor 10. These final laminations will hold the permanent magnets in place. Alternatively, adhesives or potting material can be used to hold the permanent magnets in place in their respective pockets in rotor 10.

Although rotor 10 is preferably constructed of laminations, the present invention is not so limited. By way of example, rotor 10 can also be made solid, as opposed to laminated.

Figure 2:
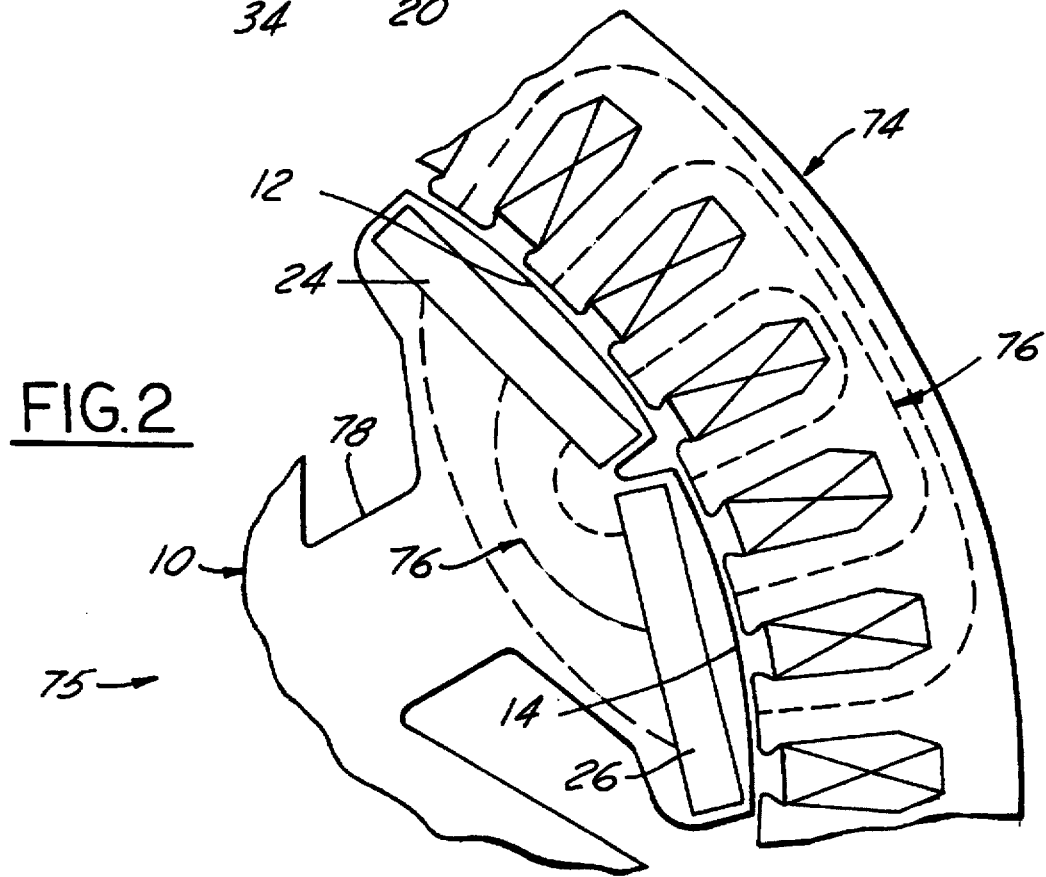
FIG. 2 is a partial cross-sectional view of rotor 10, showing in detail permanent magnet poles 12 and 14.

Referring now to FIG. 2, further features of rotor 10 will be described. FIG. 2 also illustrates stator 74, within which rotor 10 is rotateably mounted. Rotor 10 and stator 74 (among other components such as slip rings, a housing, cooling fans and the like) comprise an alternator 75. FIG. 2 illustrates permanent magnet poles 12 and 14, comprising permanent magnets 24 and 26, respectively. Most of the magnetic flux generated by permanent magnets 24 and 26 is disposed as shown by flux lines 76. As is illustrated, most of the flux is not located in base 78 of poles 12 and 14. As a result, base 78 has little tendency toward magnetic saturation, thus requiring less iron per pole than the bases of the wound-field poles. Advantage is taken of the lower iron requirement in designing the windings of wound-field poles 36, 38, 40, 42, 44 and 46, as shown in FIG. 3.

Figure 3:
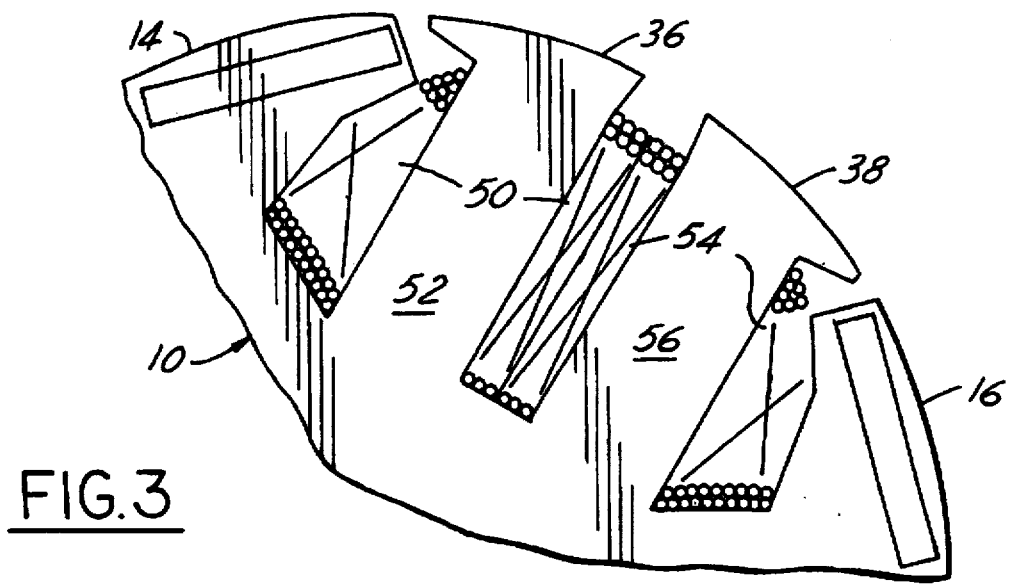
FIG. 3 is a partial cross-sectional view of rotor 10, showing in detail wound-field poles 36 and 38.

FIG. 3 illustrates wound-field poles 36 and 38 (stator 74 is omitted for clarity). Because the bases of the permanent magnet poles require relatively little iron, bases 52 and 56 of wound-field poles 36 and 38 can be made parallel to one another. In conventional rotor designs, bases 52 and 56 would likely be radially-oriented, instead of parallel to one another. If bases 52 and 56 were radially-oriented, the spaces surrounding them would taper down near the center of rotor 10, leaving little room for windings in that area. However, being parallel to one another, bases 52 and 56 allow a very large amount of wire to be wound around them, even near the center of rotor 10. This high density of wire gives alternator 75 a high power density (i.e., power output per unit volume of alternator 75).

Figure 4:
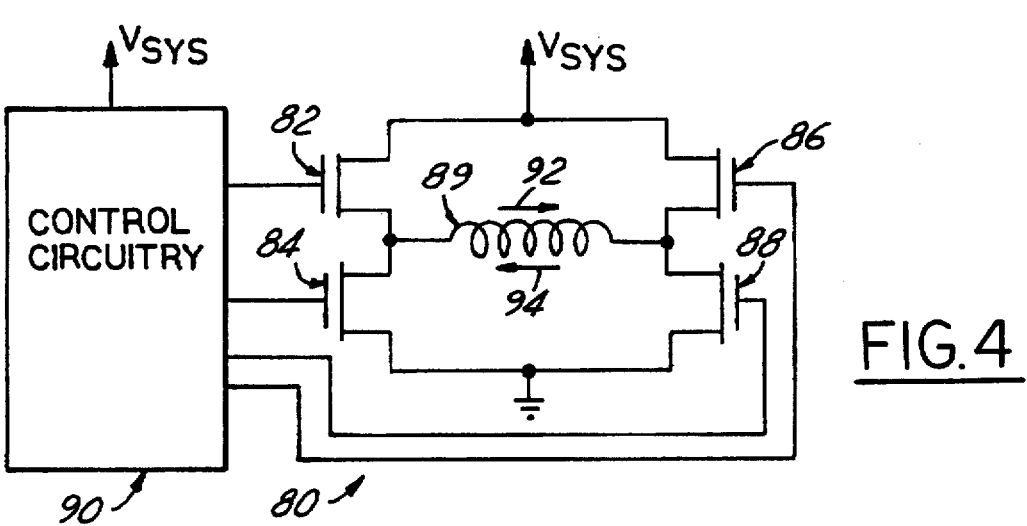
FIG. 4 is a block diagram showing a voltage regulator 80 for controlling the output voltage of alternator 75.

Control of the field current in rotor 10 is preferably accomplished by means of a bi-directional current regulator. One such regulator 80 is shown in FIG. 4. Regulator 80 comprises four semiconductor switches 82, 84, 86 and 88, arranged in an "H"-bridge configuration between system voltage ($V_{sys}$) and ground. The series connection of windings 50, 54, 58, 62, 66 and 70 is shown as field coil 89. Control circuitry 90 is connected to the gates of each semiconductor switch. Control circuitry 90 is also provided with a sense input connected to system voltage, in order to have feedback information regarding system voltage.

Control circuitry 90 can use conventional negative-feedback proportional-integral (PI) control to modulate the current through field coil 89, thereby regulating the output voltage of alternator 75. The departure of the design of regulator 80 from conventional regulator design is that bi-directional current is to be controlled through field coil 89 via switches 82, 84, 86 and 88. The reason for such bi-directional control will become apparent during the upcoming discussion.

Referring to FIGS. 1 and 4, the operation of alternator 75 will now be discussed. With current flow in one direction (say, direction 92) in field coil 89, all poles of rotor 10 will alternate in magnetic polarity around the circumference of rotor 10. Beginning with pole 12 and progressing clockwise in FIG. 1, and assuming pole 12 to be a north magnetic pole, the polarity of the poles of rotor 10 will be as follows:

TABLE 1

| Pole | Polarity |
|------|----------|
| 12 | north |
| 14 | south |
| 36 | north |
| 38 | south |
| 16 | north |
| 18 | south |
| 40 | north |
| 42 | south |
| 20 | north |
| 22 | south |
| 44 | north |
| 46 | south |

With these polarities, wound-field poles 36, 38, 40, 42, 44 and 46 work in an additive manner with permanent magnet poles 12, 14, 16, 18, 20 and 22 to "boost" the output of alternator 75. If, for a given speed of rotation of rotor 10, the output voltage of alternator 75 is too high, regulator 80 will reduce the average current through field coil 89. This reduction in current will reduce the flux generated by the wound-field poles of rotor 10, thus reducing the output voltage from alternator 75.

However, for some rotational speeds of rotor 10, even reducing current flow in field coil 89 to zero can still result in output voltages above which regulator 80 is attempting to regulate. This would be true because of permanent magnet poles' 12, 14, 16, 18, 20 and 22 ability to generate magnetic flux with no field current in field coil 89. If a reduction to zero field current is not sufficient, regulator 80 will cause current flow in the opposite direction (say, direction 94) in field coil 89. By modulating the current in the opposite direction, regulator 80 will reduce the output voltage of alternator 75 to the target value.

When regulator 80 changes the direction of the current through field coil 89, the voltage induced in the windings of stator 74 "bucks" the voltage induced by the permanent magnet poles. In this event, the polarities of the poles of rotor 10 will be as follows:

TABLE 2

| Pole | Polarity |
|------|----------|
| 12 | north |
| 14 | south |
| 36 | south |
| 38 | north |
| 16 | north |
| 18 | south |
| 40 | south |
| 42 | north |
| 20 | north |
| 22 | south |
| 44 | south |
| 46 | north |

As a comparison of Table 2 with Table 1 illustrates, each of the wound-field poles 36, 38, 40, 42, 44 and 46 changed polarity when the direction of current through field coil 89 changed. The polarity of permanent magnet poles 12, 14, 16, 18, 20 and 22, of course, remained unchanged.

The design of rotor 10 of this embodiment of the present invention is highly manufacturable, largely because it is of uniform cross-section for its entire axial length. Rotor 10 is thus a single rotor, as opposed to designs which are really two separate rotors which are axially married. For the same reason, rotor 10 can be made axially shorter than rotors of other such designs. This can provide packaging advantages.

As has been discussed, the preferable design for rotor 10 includes six permanent magnet poles disposed in pairs and six wound-field poles also disposed in pairs. However, the present invention is not limited to such a number or configuration of poles. For example, the number of wound-field poles to be employed can vary based on the speed range in which alternator 75 is to be operated. If operating in a narrower speed range than the alternator of FIG. 1, fewer wound field poles may be required in order to sufficiently "buck" the voltage induced by the permanent magnet poles at the upper end of the speed range. In such a case, four wound-field poles (for example) might be employed. In that event, the poles of rotor 10 may have polarities as follows with current in one direction in field coil 89 (with "PM" referring to a permanent magnet pole and "WF" referring to a wound-field pole):

TABLE 3

| Pole Type | Polarity |
|---|---|
| PM | north |
| PM | south |
| PM | north |
| WF | south |
| WF | north |
| PM | south |
| PM | north |
| PM | south |
| WF | north |
| WF | south |

Here, the wound-field poles would "boost" the alternator output generated by the permanent magnet poles. With current in the other direction in field coil 89, the poles would be configured as follows:

TABLE 4

| Pole Type | Polarity |
|---|---|
| PM | north |
| PM | south |
| PM | north |
| WF | north |
| WF | south |
| PM | south |
| PM | north |
| PM | south |
| WF | south |
| WF | north |

Here, the voltage induced by the wound-field poles will "buck" the voltage induced by the permanent magnet poles.

Figure 5:
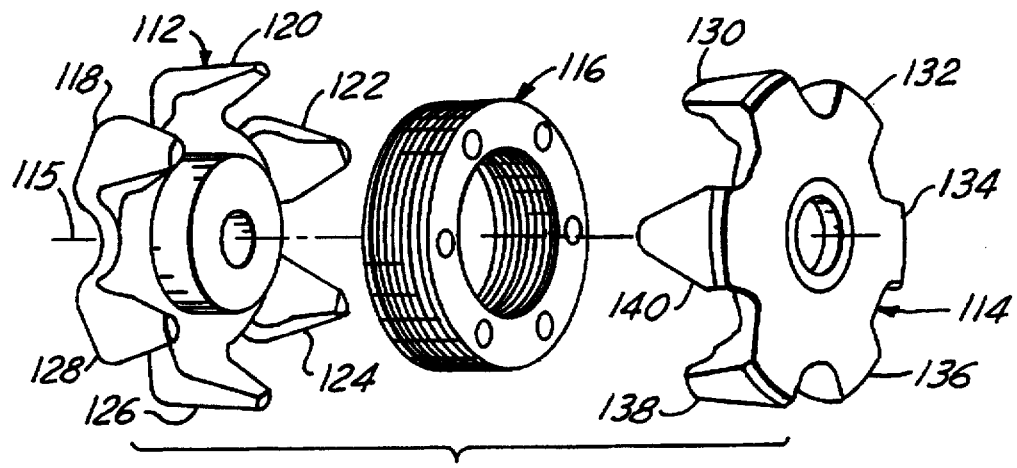
FIG. 5 is an exploded view of pertinent portions of a rotor 110 according to another embodiment of the present invention.

An alternative design for a rotor 110 according to another embodiment of the present invention is illustrated in FIG. 5. Here, rotor 110 is in a Lundell or "claw pole" configuration. Rotor 110 comprises two pole pieces 112 and 114, disposed on a shaft (not shown) and defining an axis of rotation 115 of rotor 110. Disposed on the hubs of the pole pieces is a single field coil 116. In a conventional Lundell alternator, all of the pole fingers 118 through 140 would be magnetized by field coil 116 (and would thus be "wound-field" poles). Pole fingers 118 through 128 of pole piece 112 would be magnetized with one magnetic polarity, and pole fingers 130 through 140 of pole piece 114 would be magnetized with the opposite magnetic polarity.

In this embodiment of the present invention, however, some of the pole fingers are replaced by permanent magnets poles. Such permanent magnet poles preferably have a surface of one polarity generally facing the stator of the alternator, and a surface of the opposite polarity generally facing away. Preferably, the poles of rotor 110 are disposed such that with current flowing in one direction in field coil 116, the poles of rotor 110 alternate in magnetic polarity in the following manner:

TABLE 5

| Pole | Type | Polarity |
|---|---|---|
| 118 | PM | north |
| 130 | PM | south |
| 120 | WF | north |
| 132 | WF | south |
| 122 | PM | north |
| 134 | PM | south |
| 124 | WF | north |
| 136 | WF | south |
| 126 | PM | north |
| 138 | PM | south |
| 128 | WF | north |
| 140 | WF | south |

With current flowing in this direction in field coil 116, the voltage induced by the wound field poles "boosts" the voltage induced by the permanent magnet poles. With the current in field coil 116 reversed, the poles have the following magnetic polarity:

TABLE 6

| Pole | Type | Polarity |
|---|---|---|
| 118 | PM | north |
| 130 | PM | south |
| 120 | WF | south |
| 132 | WF | north |
| 122 | PM | north |
| 134 | PM | south |
| 124 | WF | south |
| 136 | WF | north |
| 126 | PM | north |
| 138 | PM | south |
| 128 | WF | south |
| 140 | WF | north |

With current flowing in this direction in field coil 116, the voltage induced by the wound field poles "bucks" the voltage induced by the permanent magnet poles.

Current control for an alternator comprising rotor 10' can be accomplished with the bi-directional voltage regulator 80 of FIG. 4.

The permanent magnets which replace the wound-field poles in this embodiment of the present invention can be attached to pole pieces 112 and 114 in a variety of ways. For example, in forging pole pieces 112 and 114, a thin axially-projecting ledge can be formed in place of each of the wound-field poles which are to be replaced. The permanent magnets can then be attached on the ledges with a suitable method, such as with adhesive or with KEVLAR banding. Alternatively, in forging pole pieces 112 and 114, pockets can be formed in the bodies of pole pieces 112 and 114 where permanent magnets are to be employed instead of wound-field poles. The permanent magnets can each then be inserted with one end in a pocket and the other end extending axially, in the same way that the wound-field pole fingers extend.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. An electrical machine comprising:

a generally-annular stator; and a rotor rotatably mounted within said stator and defining an axis of rotation, said rotor having an axially-extending periphery, said rotor comprising a plurality of wound-field poles disposed about at least one portion of said periphery and a plurality of permanent magnet poles all disposed about at least one circumferentially-different portion of said periphery, said wound-field poles in general axial alignment with said permanent magnet poles, said permanent magnet poles each further having a magnetized surface of one polarity generally facing said stator and a magnetized surface of the opposite polarity generally facing away from said stator;

wherein said wound-field poles are salient poles;

wherein said permanent magnet poles are disposed in circumferentially-adjacent pairs, without an intervening wound-field pole;

wherein each said circumferentially-consecutive pair of permanent magnet poles share a common radially-extending base; and wherein said wound-field poles are disposed in circumferentially-consecutive pairs, without an intervening permanent magnet pole.

2. An electrical machine as recited in claim 1, wherein said pairs of circumferentially-adjacent permanent magnet poles are of opposite magnetic polarity and said pairs of circumferentially-adjacent wound-field poles are of opposite magnetic polarity.

3. An electrical machine as recited in claim 2, wherein:

said wound-field poles each have a base with windings wound around said base; and said bases of said circumferentially-adjacent pairs of wound-field poles are substantially parallel.

4. An electrical machine as recited in claim 3, wherein said rotor comprises six wound-field poles and six permanent magnet poles.

5. An electrical machine comprising:

a generally-annular stator; and a rotor rotatably mounted within said stator and defining an axis of rotation, said rotor having an axially-extending periphery, said rotor comprising a plurality of wound-field poles disposed about at least one portion of said periphery and a plurality of permanent magnet poles all disposed about at least one circumferentially-different portion of said periphery, said wound-field poles in general axial alignment with said permanent magnet poles;

wherein said wound-field poles are disposed in circumferentially-consecutive pairs.

6. An electrical machine as recited in claim 5, wherein said permanent magnet poles are disposed in circumferentially-consecutive pairs.

7. An electrical machine as recited in claim 6, wherein said pairs of circumferentially-consecutive permanent magnet poles are of opposite magnetic polarity and said pairs of circumferentially-consecutive wound-field poles are of opposite magnetic polarity.

8. An electrical machine as recited in claim 7, wherein:

said wound-field poles are salient poles;

said wound-field poles each have a base with windings wound around said base; and said bases of said circumferentially-consecutive pairs of wound-field poles are substantially parallel.

9. An electrical machine as recited in claim 8, wherein said rotor comprises six wound-field poles and six permanent magnet poles.

10. An electrical machine as recited in claim 7, wherein:

said rotor further comprises two pole pieces each with generally-circular bodies, the bodies of said pole pieces defining an axis of rotation of said rotor; and at least some of said wound-field poles extend axially from one of said pole pieces.

* * * * *

Disclaimer and Dedication 5,663,605 - Paul Michael Evans, Ypsilanti; Roy David Schultz, Dearborn, both of Michigan. ROTATING ELECTRICAL MACHINE WITH ELECTROMAGNETIC AND PERMANENT MAGNET EXCITATION. Patent dated September 2, 1997. Disclaimer and Dedication filed October 8, 1998, by the assignee Ford Motor Company.

Hereby disclaims and dedicates to the Public the entire term of said patent.
*(Official Gazette,* July 27, 1999)